July 11, 1933.  F. L. BOYD  1,917,694

FIRE EXTINGUISHING APPARATUS

Filed March 28, 1929   3 Sheets-Sheet 2

INVENTOR
Fisher L. Boyd
BY
Cyrus N. Anderson
ATTORNEY.

WITNESS:

Patented July 11, 1933

1,917,694

UNITED STATES PATENT OFFICE

FISHER L. BOYD, OF HAVERFORD, PENNSYLVANIA, ASSIGNOR TO NATIONAL FOAM SYSTEM, INC., OF PHILADELPHIA, PENNSYLVANIA, A CORPORATION OF DELAWARE

FIRE EXTINGUISHING APPARATUS

Application filed March 28, 1929. Serial No. 350,471.

My invention relates to means for extinguishing fire, and it has particular relation to apparatus for the production of fire-extinguishing foam, such an apparatus, for example, being shown in my copending application for Letters Patent of the United States Serial No. 199,277, filed June 16, 1927, and issued as Patent No. 1,785,723, dated December 16, 1930. In apparatus such as therein disclosed, different substances are introduced into separate flowing streams of water wherein they are dissolved. Upon the uniting of said streams chemical reaction between the substances in solution takes place to produce a fire-extinguishing foam. Such union of the said streams and the resultant chemical reaction should take place at a point in proximity to the place of application of the foam. The substances employed may and actually do consist of aluminum sulphate and bicarbonate of soda, together with a suitable stabilizing agent.

Heretofore, in the use of apparatus of this kind, the practice has been to terminate the conduit in a small box of rectangular or square shape into which the foam is received and from which application thereof is made. The use of such a structure has proved undesirable, because of the presence of angularly related deflecting surfaces, the presence of which has resulted in the partial breaking down of the foam, with a consequent impairment of its fire-extinguishing qualities or characteristics. The frictional resistance offered by the inner surfaces of the walls of such a terminal box structure also tends to cause the foam to break down before it reaches the fire, the extinguishment of which is desired.

One object of the invention, therefore, is to provide fire-extinguishing apparatus having a novel construction of a character to overcome the undesirable results indicated,— the invention contemplating the elimination of the right-angular bends by the provision of curved deflecting and guiding surfaces in the foam conduit. If the apparatus is employed for the protection of large oil tanks which are provided with covers, the discharge conduit is extended down into the tank, so that the foam from the conduit is discharged directly into the tank and preferably against a vertical side wall thereof.

Another object of my invention is to provide, in fire-extinguishing apparatus, a conduit for a desired material, the discharge end of the conduit being of gradually increasing dimensions, whereby the velocity and pressure of the material may be progressively decreased. Such construction further tends to prevent the premature breaking down of the fire-extinguishing foam.

Other objects and applications of my invention, as well as details of construction and operation, whereby my invention may be practiced, will be apparent more fully hereinafter, when taken in connection with the accompanying drawings, wherein Fig. 1 is a side elevational view, partly in vertical section, of one form of embodiment of my invention;

Figure 1:
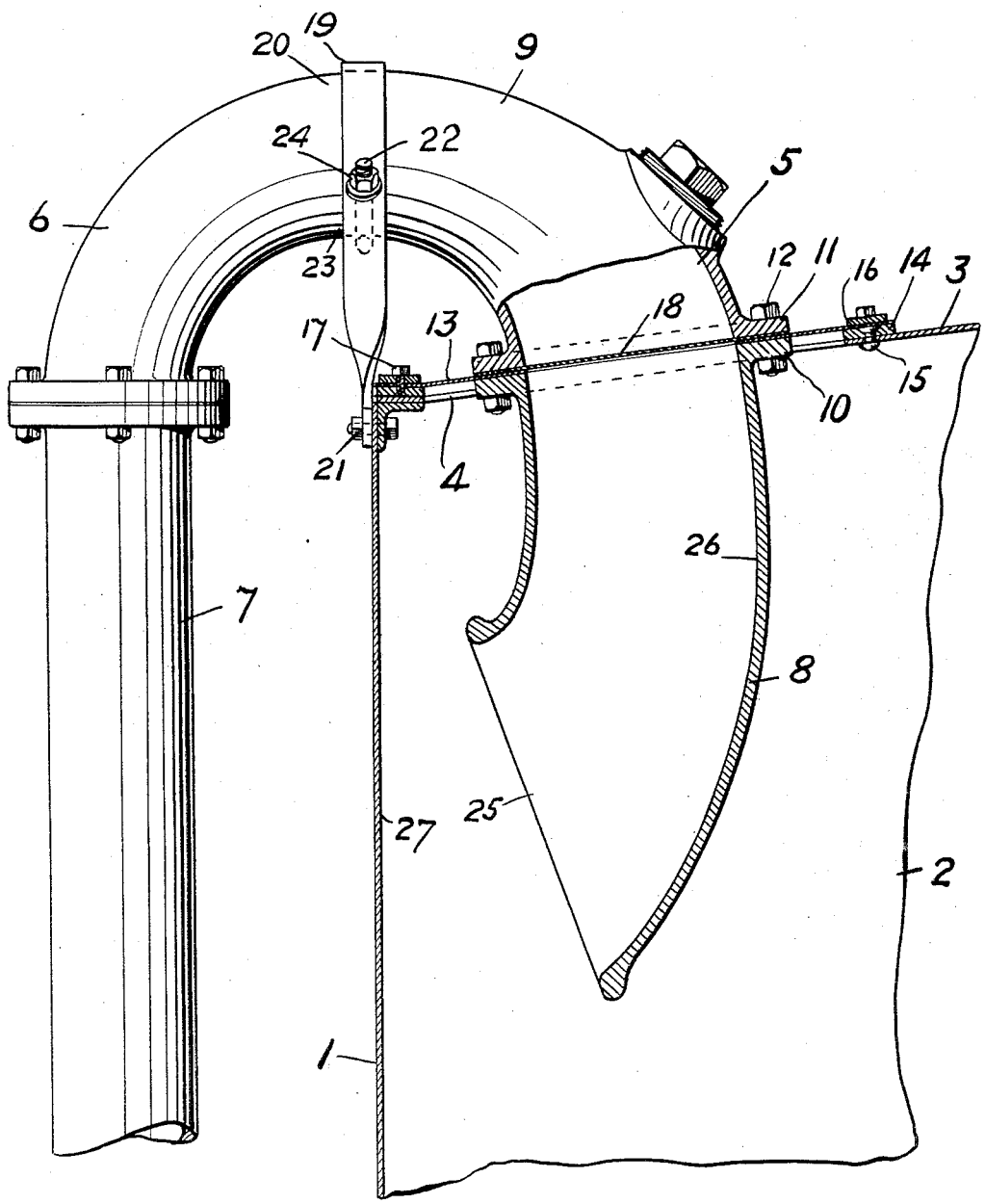
Figure 2:
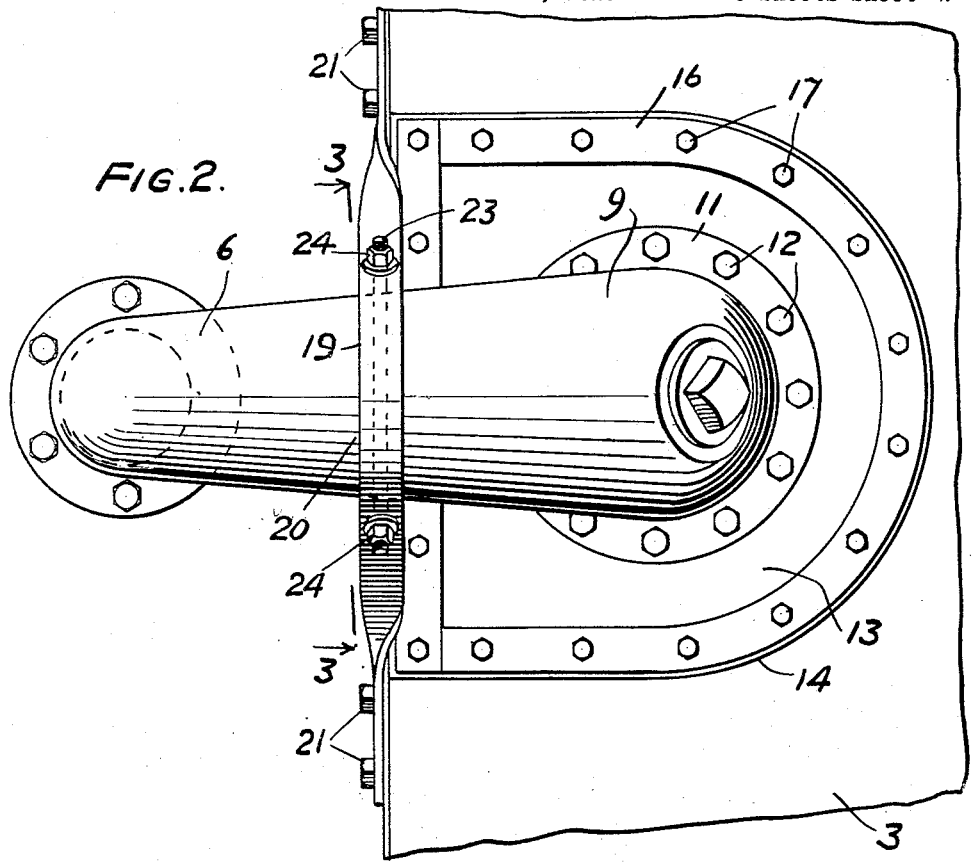
Fig. 2 is a top plan view of the structure shown in Fig. 1.
Figure 3:
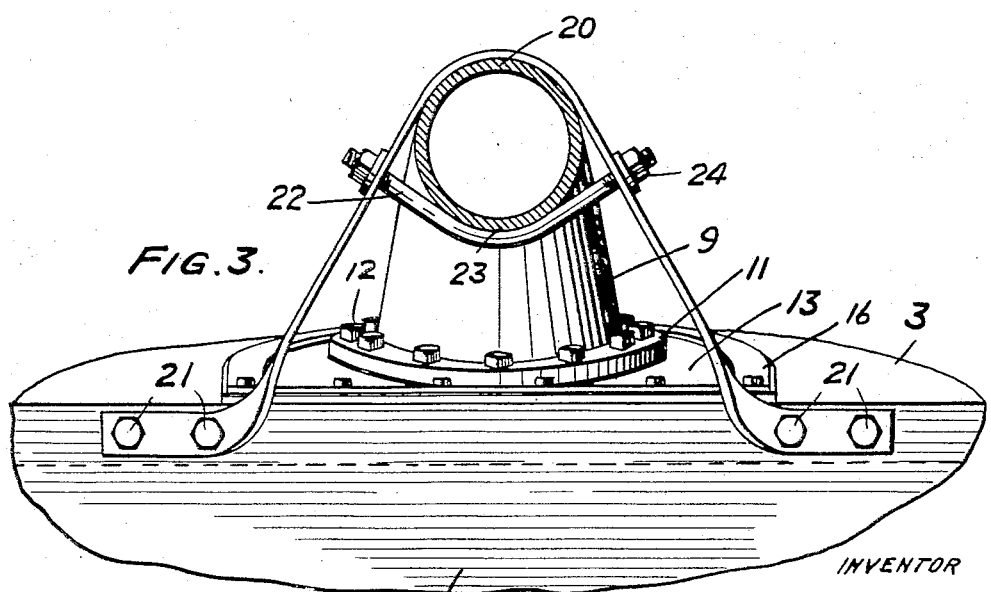
Fig. 3 is a vertical sectional view taken on the line 3—3 of Fig. 2.

For purposes of description I have illustrated the means embodying my invention as applied to an oil tank for the protection of the same, but it will be understood that it may be employed in connection with and for the protection of other structures.

In the drawings, I have shown a portion of the vertical wall 1 of an oil tank 2 having a top or cover 3. The cover 3 is provided with an opening 4 through which extends one leg 5 of a conduit end portion of inverted U-shape. An opposite leg 6 of said conduit end portion is positioned on the outside of the wall 1 of the tank, and it is secured to an upper end of a vertical conduit section 7 leading from the foam-producing apparatus (not shown). In fact, the section 7 has connection with the said apparatus at the point of union of the two streams previously referred to which hold the foam-producing substances in solution.

The leg portion 5 of the conduit comprises inner and outer sections 8 and 9 which are provided with abutting flanges 10 and 11 positioned approximately in the plane of the top 3. The flanges may be clamped together by means of bolts 12 passing therethrough. Positioned intermediate the flanges 10 and 11 is a closure plate 13 for the opening 4 in the tank cover 3. The outer peripheral edge of the closure plate 13 rests upon a shoulder formed by a member 14 which extends around the opening 4. The member 14 may be riveted to the top or cover 3, as shown at 15 in Fig. 1. Movement of the closure plate 13 on the member 14 is prevented by means of a clamping member 16 and screws 17. The closure plate 13 is preferably made of relatively light material compared with the cover 3, whereby said closure plate may tear quickly in event of an explosion in the tank 2.

The passage of fumes from the tank 1 through the conduit end portion to the foam-producing apparatus (not shown) may be prevented by means of a diaphragm 18 which is positioned between the adjacent ends of the conduit sections 8 and 9 and clamped in position by means of the flanges 10 and 11 and bolts 12. The material used in the diaphragm 18 is such that it readily tears when the pressure of the foam in the conduit end portion reaches a predetermined working value.

The conduit end portion may be further supported by strap means as shown in the drawings, wherein it is noted that a strap 19 is bent around an upper side portion 20 of the conduit and is secured at its ends by bolts 21 to the outer side of the vertical wall 1. A bolt 22 of arc-shape extends around a lower side portion 23 of the conduit and is secured at its ends to the opposite legs of the strap 19 by nuts 24.

In accordance with my invention, the end portion of the conduit is of gradually increasing diameter from the section 7 to a discharge opening 25. Such construction permits the foam to expand as it approaches the discharge opening 25, and it also causes a gradual decrease in the velocity of the foam before it passes through said opening. One of the factors causing the premature breaking down of the foam, therefore, is eliminated. The construction of the discharge end portion of the foam-carrying conduit of U-shape results in the provision of a curved deflecting surface 26 which causes a gradual change in the direction of movement of the foam through an angle of nearly 270 degrees with substantially no frictional losses.

As shown in Fig. 1, the discharge opening 25 is positioned immediately adjacent to an inner surface portion 27 of the side wall 2 directly below the top or cover 3. The plane of the opening 25 is such that fluid passing therefrom strikes the inner surface portion 27 and is deflected downwardly into the oil tank 2. The discharging of the foam directly into the oil tank 2, and particularly into direct contact with the vertical side wall thereof, assures maximum desired results from the foam.

Figure 4:
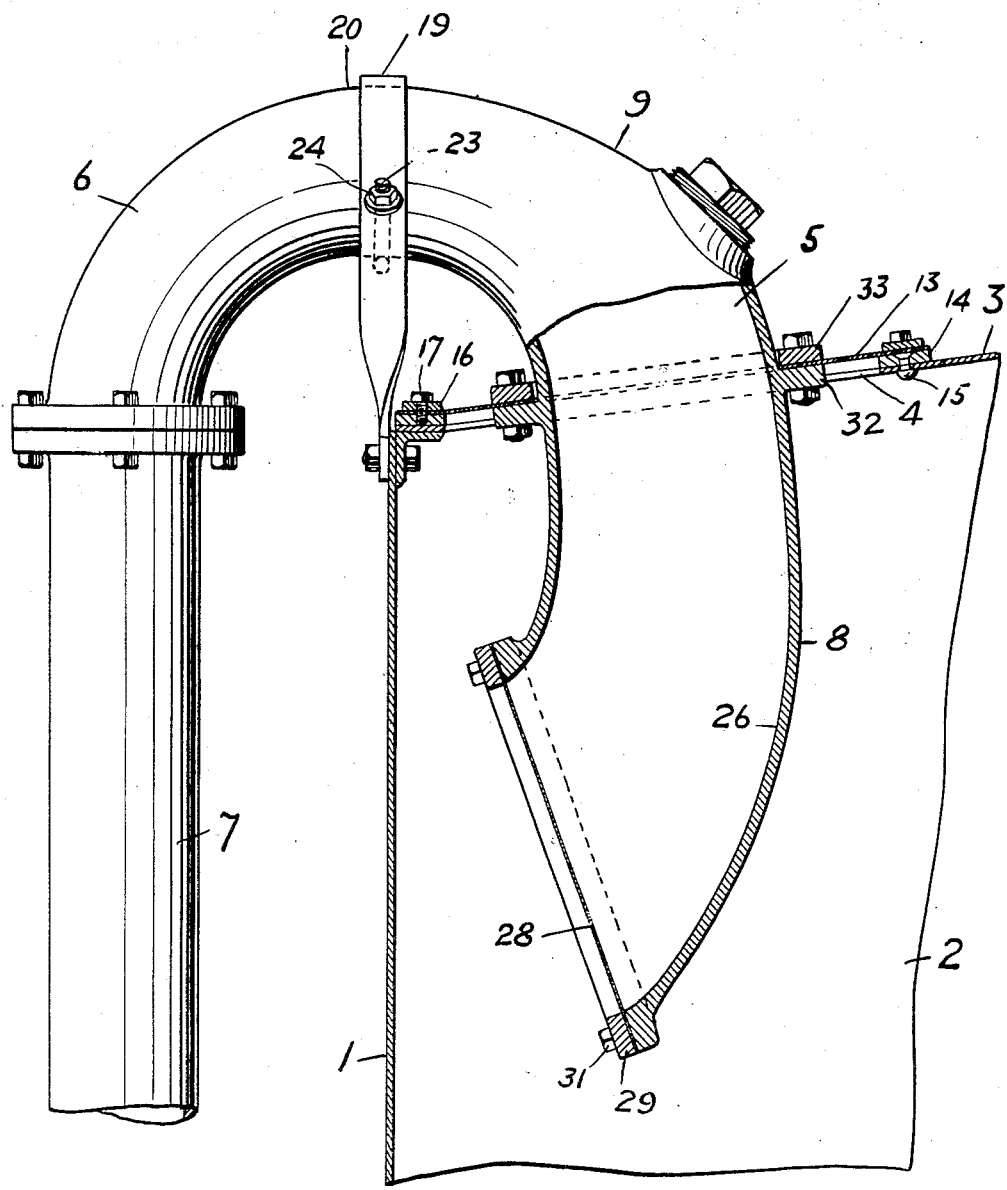
Fig. 4 is a view similar to Fig. 1 but showing an alternative embodiment wherein the conduit outlet is closed by means of a thin cover.

The structure shown in Fig. 4 is distinguishable from that illustrated in Fig. 1 inasmuch as the discharge opening 25 is closed by means of a diaphragm 28 which is secured in position by means of a clamping ring 29 and bolts 31. As in the case of the diaphragm 18, the diaphragm 28 is formed of a material which readily tears when the pressure of the foam in the conduit end portion reaches a predetermined working value. A further difference is in the forming of the separate sections 8 and 9 of Fig. 1 as an integral casting. A flange 32 corresponding to the flange 10 is formed on the casting but the flange 11 of Fig. 1 is replaced by a clamping ring 33.

While I have shown only two forms of embodiment of my invention, for the purpose of describing the same and illustrating its principles of construction and of operation, it is apparent that various changes and modifications may be made therein without departing from the spirit of my invention. I desire, therefore, that only such limitations shall be imposed thereon as are indicated in the appended claims or as are demanded by the prior art.

Having thus described my invention, what I claim and desire to secure by Letters Patent is:

1. In fire-extinguishing means, the combination of a tank adapted to contain oil or other highly inflammable material, the top of the said tank being closed, a conduit for conveying a fire-extinguishing material directly into the said tank, said conduit terminating in a bent discharge end portion in adjoining relation to the said top and to the side wall of the said tank, the diameter of the portion of the said conduit near its discharge opening gradually increasing the said opening, said opening facing toward the inner side of the wall of the said tank so that the fire-extinguishing material discharged therefrom is projected against said wall.

2. Apparatus for extinguishing the fire of a burning tank of inflammable liquid material, comprising a substantially continuous conduit having a discharge opening, the portion of said conduit adjacent and leading to said opening being of gradually enlarged cross-section so that the velocity of the material passing through said conduit may be decreased, the discharge opening of said conduit being disposed in a vertically inclined plane such that it faces downwardly and toward the inner side of a portion of the wall of the said tank to cause the fire-extinguishing material to strike the same and flow downwardly thereon and thence over the surface of said inflammable material.

3. In apparatus for extinguishing fires in oil tanks and the like, a conduit for supplying fire-extinguishing material into the interior of the tank, said conduit being of substantially inverted U-shape and disposed with the leg portions thereof in straddling relation with respect to the upper edge of the tank wall, the leg portion of the conduit which is disposed interiorly of said tank wall being of gradually increasing cross-section and terminating in a discharge opening facing toward the inner surface of said tank wall at a point below said upper edge thereof.

In testimony that I claim the foregoing as my invention I have hereunto signed my name this 26th day of March, A. D. 1929.

FISHER L. BOYD.